SERIAL MEMORY SYSTEM

Filed Aug. 2, 1954 3 Sheets-Sheet 1

INVENTORS
Kun Li Chien &
Charles H. Propster, Jr.
BY Morris Rabkin
ATTORNEY

INVENTORS
Kun Li Chien &
Charles H. Propster, Jr.
BY Morris A. Rabkin

INVENTORS
Kun Li Chien &
Charles H. Propster, Jr.
BY Morris [signature]
ATTORNEY United States Patent Office
2,817,072
Patented Dec. 17, 1957

2,817,072

SERIAL MEMORY SYSTEM

Kun Li Chien and Charles H. Propster, Jr., Haddonfield, N. J., assignors to Radio Corporation of America, a corporation of Delaware Application August 2, 1954, Serial No. 447,162
37 Claims. (Cl. 340—174)

This invention relates to digital information handliing systems, and particularly to a serial memory system used therein.

Generally, in an electronic digital computer, the information that is handled by the input and output devices of the computer is in sequential form. However, the rates at which the information can be handled by the different input and output devices may vary considerably. For example, an electric typewriter can print successive characters at a rate of about ten per second, while the sequential information rate for magnetic tape may be of the order of a thousand times faster. Notwithstanding this large discrepancy in information rates, it is often desirable to transfer information from one device to another, such as from magnetic tape to an electric typewriter. Another aspect of the problem is that these computer devices cannot be synchronized to a common timing reference. Accordingly, a time transfer system or information storage is required to convert the information rate of one device to that of another.

A magnetic drum storage system may be used for performing such information rate conversion. The information may be transferred into the drum storage at a relatively high rate, and read-out of the drum in sequence at a low rate as required by the output device. In one prior system, the information on the drum is read continuously and repeatedly in successive drum revolutions. Control of the read-out may be performed by a drum counter and a read-out counter. The drum counter counts timing pulses on the drum timing track to indicate the line of information being read at any instant. The read-out counter indicates the next line of information to be read out to the output device when the latter is ready for it. A demand signal from the output device enables a gate to pass the proper line of information to the output device when the drum counter registers the same count as the read-out counter. The read-out counter is then advanced a count to read-out the next line in sequence when it is demanded by the output device. In this prior arrangement two counters and a comparator are used to control the read-out.

A drum with a fixed timing track is a synchronized machine. Such a drum cannot be connected to receive information from a nonsynchronous device such as magnetic tape without some extra temporary storage.

Accordingly, it is among the objects of this invention to provide:

(1) A new and improved system for transferring information between information handling devices that operate at different rates.

(2) A new and simple information rate converting system that permits transfer of information at optimum speed.

(3) A new and simple information rate converting system that is reliable and economical in construction.

(4) A new and improved serial memory system that may be used as an information rate converter.

(5) A new and improved serial memory system for controlling the order of information transfer.

(6) A new and simple serial memory system that may be operated nonsynchronously and that is reliable and economical in construction.

In accordance with this invention a serial memory system is employed for transferring information between information handling devices that have different information rates. A cyclic memory, such as a continuously rotating magnetic drum, is employed for receiving the information from the high-speed device and transferring the information at a lower speed to the other device. A plurality of parallel channels on the drum magnetically store the information signals serially around the drum. Another parallel channel is employed for storing control signals that control the sequence of read-out. A control signal is written in the control channel each time a line of information is read out to the output device. The presence of the control signal in the channel indicates that the corresponding line of information has been previously read out. The control signal is employed to inhibit the read-out of the corresponding information line a second time. If read-out of an information line is inhibited, the next information line that does not have a corresponding inhibit-control signal is then read-out. Thus, the read-out of information is in the proper sequence.

The foregoing and other objects, the advantages and novel features of this invention, as well as the invention itself both as to its organization and mode of operation, may be best understood from the following description when read in connection with the accompanying drawings, in which like reference numerals refer to like parts, and in which.

Figure 1:
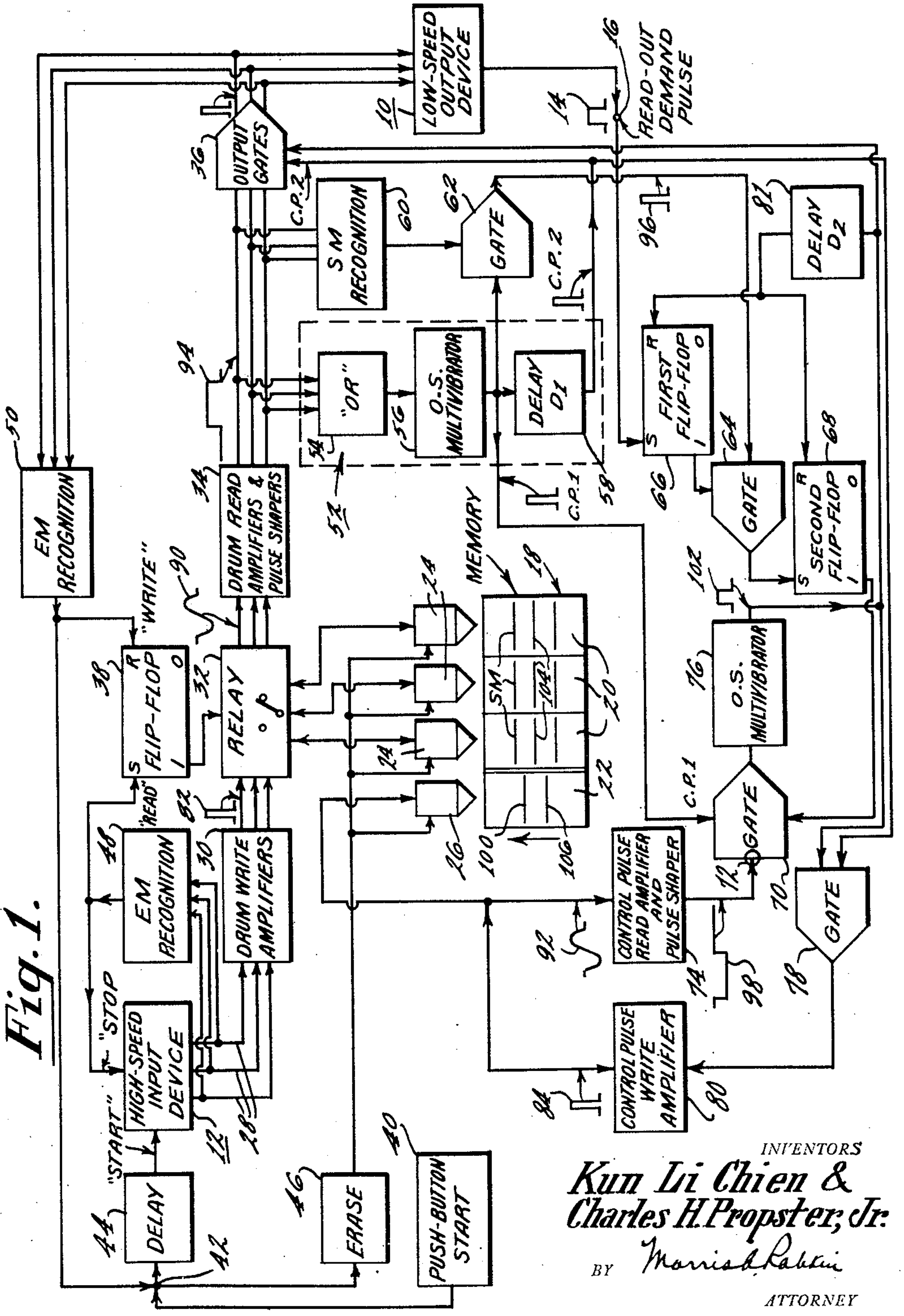
Figure 1 is a schematic block diagram of a serial memory system and information rate converter embodying this invention.

Referring to Figure 1, on the right there is shown an output device 10 which may be considered as operating at relatively low speeds. At the left, is an input device 12 which operates at relatively high speeds. A serial memory system is employed for transferring the information from the high-speed input device 12 to the low-speed output device 10 at a rate compatible to both.

The output device 10 may be an electromechanical device, such as a typewriter, printer or tape perforator. Such devices complete an operation by the making or breaking of a circuit. This action may be utilized as a "ready" or "demand" electrical signal to indicate that the output device 10 is in condition to receive the next unit of information and perform the required operation. This demand signal is shown as a pulse 14 that is applied to a terminal 16 of the serial memory system.

The input device 12 may be a magnetic tape recording station from which the information may be read intermittently in bursts and at a high rate. The serial memory is shown as a magnetic drum 18 which has a magnetizable surface and is continuously rotated in the direction shown by the arrow. A plurality of parallel channels 20 around the periphery of the drum 18 are employed for storing information signals. The signals to be stored may take the form of a pulse and the absence of a pulse. The drum surface may be uniformly magnetized in one direction to represent the absence of a pulse, and small areas magnetized in the opposite direction may represent a pulse. Combinations of signals occurring at the same time in parallel channels 20 form a code group or information character. Another channel 22 on the drum 18 is used as a unitary control channel for storing control signals. Separate read-write heads 24, 26 are mounted adjacent the drum channels 20, 22 and aligned to read a line of signals extending along the length of the drum 18.

The signals are stored serially in each channel 20, 22 around the periphery of the drum 18 starting with the first or "start of message" (SM) character. The read-write heads 24, 26 are arranged so that signals of corresponding order around the periphery are read at substantially the same time.

The information signals from the input device 12 are carried through separate parallel channels 28 to the read-heads 24 of the drum information channels 20. The channels 28 from the input device 12 include separate drum write-amplifiers 30 (three amplifiers 30 are shown as a single block), the outputs of which are connected to terminals of separate single-pole-double-throw relay switches 32. The movable contacts of the relay switches 32 are connected to different unitary read-write heads 24. The other fixed contacts of the switches 32 are connected to separate drum read amplifiers and pulse shapers 34 (shown as a single block). Each of the pulse shapers 34 are connected to one of the inputs of different "And" gates 36 (the three "And" gates being shown as a single block). These "And" gates 36 have their outputs connected to the output device 10.

A flip-flop 38 is used to control the position of the relay 32. When this relay flip-flop 38 is set, the relay 32 is energized to actuate the switches to the "read" position; and when the flip-flop 38 is reset, the switches are actuated to the "write" position.

The writing of information from the input device 12 into the drum memory 18 may be initiated by a push-button switch 40 which is connected to a "start" terminal 42 and through a delay line 44 to the "start" input of the input device 12. The "start" terminal 42 is also connected to an "erase" current generator 46 which applies a direct current to all of the write-heads 24, 26 of the magnetic drum 18 to magnetize the surface of the drum 18 uniformly in one direction. The output channels 28 of the input device 12 are connected to an "end of message" (EM) recognition gate 48 which applies a pulse to the "stop" terminal of the input device 12 and also to the set input S of the relay flip-flop 38. The output gates 36 are also connected to another EM recognition gate 50, which applies a pulse to the reset input R of the relay flip-flop 38 and also to the "start" terminal 42.

The serial memory system is synchronized by a clock pulse generator 52. The clock pulse generator 52 includes an "Or" gate 54 which receives the read information signals from the pulse shapers 34. The output of the "Or" gate 54 is applied to a one-shot multivibrator 56, which produces a first clock pulse CP1 when it receives a pulse from the "Or" gate 54. The clock pulse CP1 is applied to a delay line 58, the output of which is a second clock pulse CP2 occurring a delay $D_1$ after CP1.

The outputs of the pulse shapers 34 are also applied to a "start of message" (SM) recognition gate 60. The output of the SM recognition gate 60 is applied to one input of a two-input "And" gate 62, the other input of which is CP1. The output of this "And" gate 62 is applied to one input of another two-input "And" gate 64.

The demand pulse applied to the terminal 16 sets a first flip-flop 66, which applies an enabling voltage from the 1-output of the flip-flop 66 to the other input of the gate 64. The output of the gate 64 is connected to the set side of a second flip-flop 68. The 1-output of the second flip-flop 68 provides an enabling voltage for an inhibit "And" gate 70. The pulse CP1 is applied to one of the input of this "And" gate 70. The third input 72 of this gate 70 is an inhibit input. The read-head 26 of the control-pulse channel 22 is connected to a read amplifier and pulse shaper 74, the output of which is applied to the inhibit input 72 of the gate 70. The output of the inhibit gate 70 is applied to a one-shot multivibrator 76 which produces a pulse that is applied to all of the output gates 36 and to another two-input gate 78. CP2 is applied to all of the output gates 36 and also to the gate 78. The output of this gate 78 is applied to a control-pulse write amplifier 80 which is connected to the write head 26 of the control-pulse channel 22. The one-shot multivibrator 76 pulse is also applied through a delay line 81 of delay $D_2$ to the reset inputs of the first and second flip-flops 66, 68. Each flip-flop is a bistable trigger circuit having two input terminals, designated S (set) and R (reset), and two output terminals designated "1" and "0." Application of a signal to the S terminal sets the flip-flop circuit with its 1-output established at a relatively high voltage level and its 0-output low. Application of a signal to the R terminal resets the trigger circuit in the reverse condition.

When a start signal is applied to the "start" terminal 42 all of the signals previously stored in the drum 18 are erased. The relay flip-flop is reset 38, and the relay switches 32 are switched in the "write" position. If the input device 12 is a magnetic tape storage, the tape is then started by the "start" signal, and the information read from the tape. The information signals in the separate tape channels 28 are applied to the write amplifiers 30 and written into the corresponding drum channels 20. The first line of information that is read into the memory may be a special code group of signals representing SM. The information characters are written in the drum channels 20 in the same sequence that they come from the tape. A large number of characters are transferred to the drum 18 in a burst. The last code group that is written in the drum channels 20 may be a special code combination for EM which is recognized by the EM recognition gate 48. The EM gate 48 generates a pulse to stop the input device 12 and to set the relay flip-flop 38. The flip-flop 38 switches the "read" position. The setting of the flip-flop 38 may also be used to reset the first and second flip-flops 66, 68 to ensure that the memory system is in proper condition to start the read-out.

Figure 2:
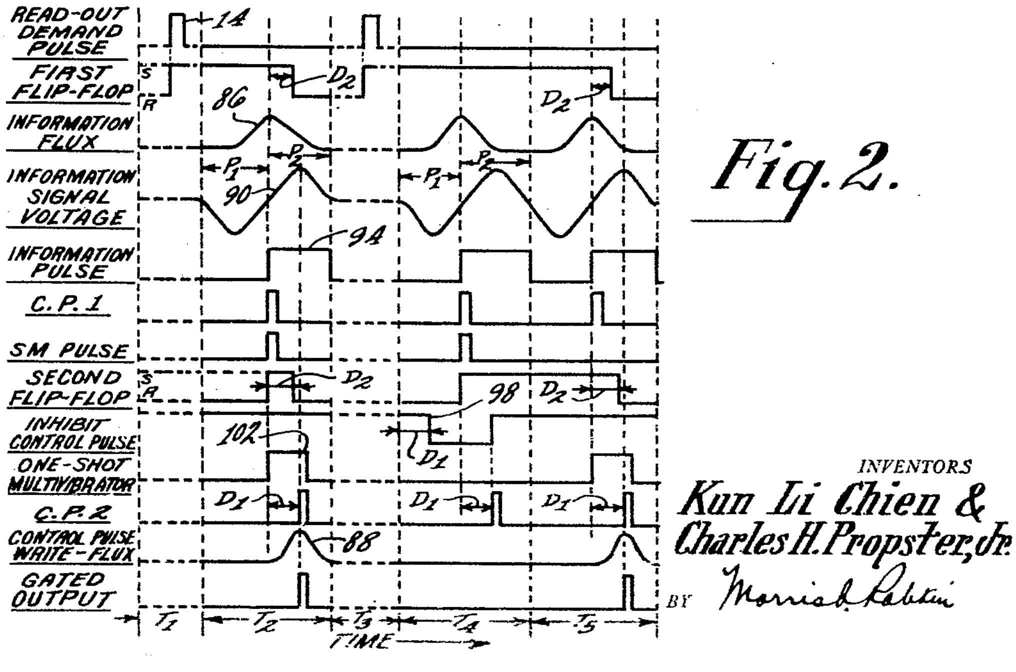
Figure 2 is an idealized graphical timing diagram showing the relationship of waveforms occurring at different portons of the system of Figure 1.

The signals applied to the write-heads 24, 26 may be rectangular pulses 82, 84. The "write" pulses 82, 84 magnetize the small area of the drum surface then passing the write-heads 24, 26 in the opposite direction from its initial state. The corresponding flux waveforms 86, 88 are shown in idealized form in the graph of Figure 2. The absence of a pulse is represented by no change in the magnetic state of the drum surface. The voltage waveforms 90, 92 induced in the read heads 24, 26 are the time derivatives of the flux waveforms 86, 88. The voltage wave-forms 90, 92 are shown in Figure 2 as including a negative-going pulse during the first half-period $P_1$ and a positive-going pulse during the second half-period $P_2$ (see Figure 2). The drum read amplifiers 34 amplify the voltage waveform. The pulse shapers 34 may consist of a half-wave rectifier and diode clipper (not shown) which will block the negative-going pulses and produce a rectangular wave 94 for the positive-going pulse.

Each code group of parallel signals that form an information character includes at least one pulse. Accordingly, each time a character is read from the drum 18 at least one pulse is applied to the "Or" gate 54 of the clock pulse generator 52. Thus, for each character that is read, the one-shot multivibrator 56 is triggered to generate CP1 at the leading edge of the information pulse 94. Accordingly, CP1 occurs at the beginning of the second half-period $P_2$ of the voltage waveform 90. These time relationships are shown in Figure 2.

The read-out operation is now described: The drum 18 is continuously rotating, and the signals stored on the drum 18 are read continuously by the read-heads 24, 26. The control pulse channel 22 is in the erased condition so that no pulses are read by the control-pulse head 26. The drum read amplifiers 34 are continuously receiving signals from the information channels 20 and applying signals to the clock pulse generator 52, the SM recognition gate 60 and the output gates 36. However, the output gates 36 are closed in the absence of an enabling pulse from the one-shot multivibrator 76. The first demand pulse 14 from the output device 10 sets the first flip-flop 66, which, in turn, applies an enabling voltage to gate 64 (time interval $T_1$ in Figure 2). When the first information line SM on the drum 18 is next read (time interval $T_2$), the SM recognition gate 60 produces a pulse which is passed by gate 62 during the application of CP1. The SM pulse 96 passes through the opened gate 64 to set the second flip-flop 68. The second flip-flop 68 applies an enabling voltage to the inhibit gate 70. Since the control channel 22 is in the erased condition, there are no inhibit pulses 98, and the inhibit gate 70 is not inhibited. Thus, CP1 is passed by the open gate 70 to trigger the one-shot multivibrator 76. The resulting pulse 102 generated by the multivibrator 76 opens the output gates 36. As a result, upon the occurrence of CP2 formed from the SM character, this SM character is passed through the output gates 36 to the output device 10.

The one-shot multivibrator pulse 102 also opens the "write" gate 78 so that CP2 is passed and applied to the write amplifier 80. The write-head 26 writes a first control pulse 100 in the control channel 22 which corresponds to the first information character SM. The first control pulse 100 is written behind the line of SM a distance that corresponds to the delay $D_1$ between CP1 and CP2. The multivibrator pulse 102 also resets the first and second flip-flops 66, 68 after a delay $D_2$.

The pulse shaper of the control-pulse read amplifier 74 is arranged to provide a rectangular negative-going pulse 98 during the first half-period and to block the positive-going portion of the voltage waveform 92 during the second half-period. The magnetized area on the drum 18 that represents the first control pulse 100 starts to pass the control-pulse read-head 26 at a time $D_1$ after the line of magnetized areas for SM start to pass the information read heads 24. However, the negative-going portion of the control-pulse voltage waveform 92 is used to shape the rectangular inhibit pulse 98, and this negative-going portion occurs during the first half-period. The delay $D_1$ is chosen to be substantially less than a half-period which results in the leading edge of the inhibit pulse 98 starting during the first half-period $P_1$ and before CP1 (see $T_4$ in Figure 2). The trailing edge of inhibit pulse 98 terminates after CP1 and during the second half-period $P_2$.

During time interval $T_3$ (Figure 2), the second read-out demand pulse 14 is applied to set the first flip-flop 66. During $T_4$, SM is recognized, the next time around, and the second flip-flop 68 is set. However, the inhibit pulse 98 formed from the first control pulse 100 is already applied to the inhibit gate 70. Thus, the gate 70 is closed, and CP1 is not passed. The one-shot multivibrator 76 is not triggered, and the SM line of information is not read out by the closed output gates 36.

However, for the second line of information 104 (time interval $T_5$) there is no corresponding control pulse written in channel 22. As a result, during the period $T_5$ in which the second information line 104 is read the gate 70 is not inhibited. Accordingly CP1 for the second information character 104 is passed by the inhibit gate 70 to trigger the one-shot multivibrator 76. The output gates 36 are opened, and the second information character 104 is read out to the output device 10. At the same time a second control pulse 106 is written in the second control channel 22 corresponding to the second information line 104.

The read-out operation is repeated for each demand pulse 14, being read out with each succeeding demand pulse. When the last character (EM) is read out, the EM recognition gate 50 applies a pulse to the relay flip-flop 38 to switch the relay 32 to the "write" position. The EM gate 50 also applies a pulse to the "start" terminal 42. As a result, an erase pulse is applied to the write-heads 24, 26 to erase all the signals on the drum 18, and, after a predetermined delay, a start signal is applied to the input device 12 to write the next burst of information in the drum 18.

The conditions necessary for read-out are the recognition of the first information character and the absence of a control pulse. As a result of these conditions being set in the logic network, the information characters are read out in sequence from the drum. The rate of read-out is determined by the rate of operation of the output device. It is seen that it is not necessary to synchronize the writing of information into the drum with the input device or to synchronize the read-out of information with the output device. The output can be called for at random by the output device. The rate conversion performed by the serial memory system may be from an input of several thousand units of information per revolution of the drum. Large counters and temporary storage registers are avoided and replaced by an extra control-pulse channel on the magnetic drum, which extra channel is relatively inexpensive.

CP1 and CP2 are described as being generated during the second half-period $P_2$ of the information waveform 90. These clock pulses, CP1 and CP2, may also be generated some time during the first half-period $P_1$ of the information waveform. Under such circumstances the control pulses 100, 106 would be written at the time of CP2 on the drum channel 22 in locations that are in advance of the corresponding information characters SM and 104. The control pulses 100, 106 then pass the read-head 26 before the corresponding information characters pass the heads 24. Therefore, the beginning of the inhibit-control pulse waveform 92 occurs before the beginning of the information signal waveform 90. Thus, the inhibit-control pulse 98 may be used during subsequent drum revolutions to control the transmission of the corresponding information character through the output gates 36. Although the inhibit-control pulse is written subsequently to the generation of the corresponding CP1, during a subsequent revolution of the drum 18, the inhibit-control pulse may be read before the same CP1 to control or inhibit the effect of that CP1.

A description of an appropriate form of magnetic drum may be found in the book "High Speed Computing Devices," McGraw-Hill, 1950, page 322. Appropriate forms of gate circuits are described in the article "Diode coincidence and mixing circuits" by Tung Chang Chen in Proc. of the IRE, May 1950, page 511. The flip-flops may be any bistable multivibrator such as the Eccles-Jordan trigger circuit. The one-shot multivibrators may be any monostable multibrator. A suitable code recognition gate is described in the Patent No. 2,648,829, Ayres et al., issued August 11, 1953.

Figure 3:
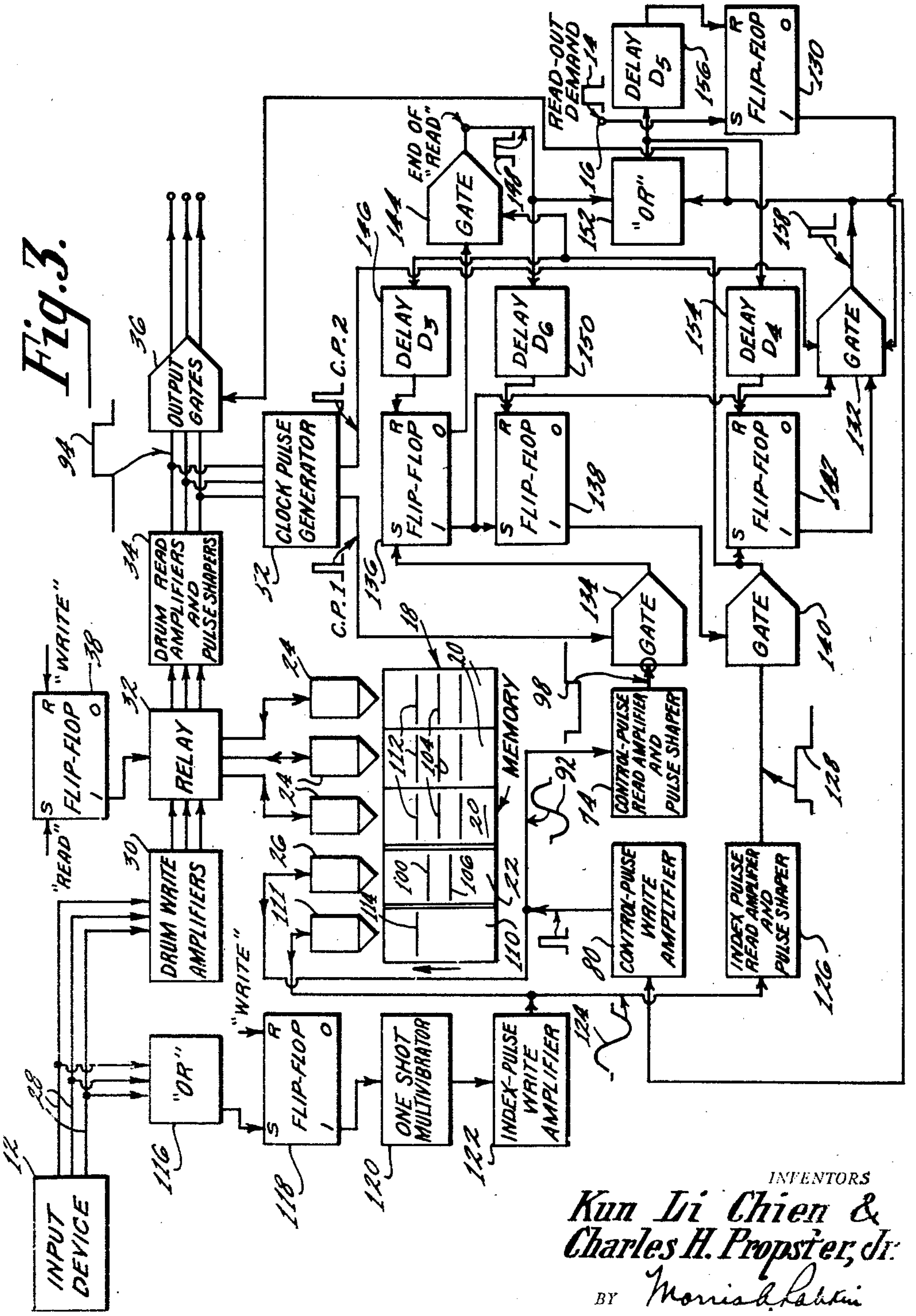
Figure 3 is a schematic block diagram of another embodiment of a serial memory system and information rate converter incorporating the features of this invention.

Referring to Figure 3, another embodiment of this invention is shown which does not require special code forms such as SM and EM to mark the first and last code groups on the drum 18. The same reference numerals are used in Figure 3 for parts previously described with respect to Figure 1.

An extra channel 110 on the magnetic drum 18 and an associated read-write head 111 are provided to index the first code group 112 of information on the drum 18. An index pulse 114 is written in the index channel 110 in alignment with the first information character 112. This operation is performed by means of an "Or" gate 116 which receives the information signals from the input device 12. The output of the "Or" gate 116 sets a flip-flop 118. A one-shot multivibrator 120 receives a pulse from the 1-output of the flip-flop 118 when it is set and produces a pulse that is applied to an index-pulse write amplifier 122.

When the first character 112 is read from the input device 12 and written in the drum information channels 20, a pulse through the "Or" gate 116 sets the flip-flop 118. This results in a pulse being applied to the index pulse write head 111. Thus, the index pulse 114 is stored on the magnetic drum in a position corresponding to the first character 112. The flip-flop 118 remains set throughout the burst of information from the input device 112. This flip-flop 118 is subsequently reset when a new burst of information is to be written into the drum 18 so that an index pulse 114 will be stored in the index pulse channel 110 to index the first code group 112 of this new burst.

The read winding (not shown) of the index read head 111 may be wound in the opposite direction from that of the other read heads 24, 26. Consequently, the index voltage waveform 124 is positive-going during its first half-period and negative-going during its second half-period. This index voltage waveform 124 is applied to a read amplifier and pulse shaper 126 which may be the same as the corresponding circuit 34 for the information channels 20. Thus, an index pulse 128 is produced that is positive-going and of generally rectangular configuration, and that occurs during the first half of the waveform period.

The read-out demand pulse 14 from the output device 10 sets the first flip-flop 130. The 1-output of this flip-flop 130 provides a first enabling signal for a four-input "And" gate 132. CP1 is applied to an inhibit gate 134 and is passed by this gate 134 in the absence of the inhibit control pulse 98 to set a second flip-flop 136. The 1-output of this control-pulse flip-flop 136 provides a second enabling signal for the four-input "And" gate 132. The 1-output of the control-pulse flip-flop 136 is also used to set a fourth flip-flop 138. The 1-output of the fourth flip-flop 138 provides an enabling signal for a two input "And" gate 140. The index pulse 128 is applied to the other input of this "And" gate 140. The index pulse 128 passed by the gate 140 sets an index-pulse flip-flop 142, the 1-output of which provides a third enabling signal for the four-input gate 132. The index pulse 128 passed by the gate 140 is applied to another "And" gate 144 and also, through a delay line 146, to the reset input of the control-pulse flip-flop 136. The other input of this "And" gate 144 receives an enabling signal from the 0-output of the control-pulse flip-flop 136. The output of this gate 144 is an "end-of-read" pulse 148 which is applied to the reset input of the fourth flip-flop 138 through another delay line 150. The end-of-read pulse 148 is also applied to an "Or" gate 152. The output of the "Or" gate 152 is connected through separate delay lines 154, 156 to the reset inputs of the index-pulse and demand pulse flip-flops 142, 130. CP2 is the fourth input to the four-input "And" gate 132. The output of this gate 132 is an output gating pulse 158 applied to the output gates 36 and also applied to the control-pulse write amplifier 80. The output gating pulse 158 is also applied to the "Or" gate 152 for purposes of resetting the demand-pulse flip-flop 130 and the index-pulse flip-flop 142.

Figure 4:
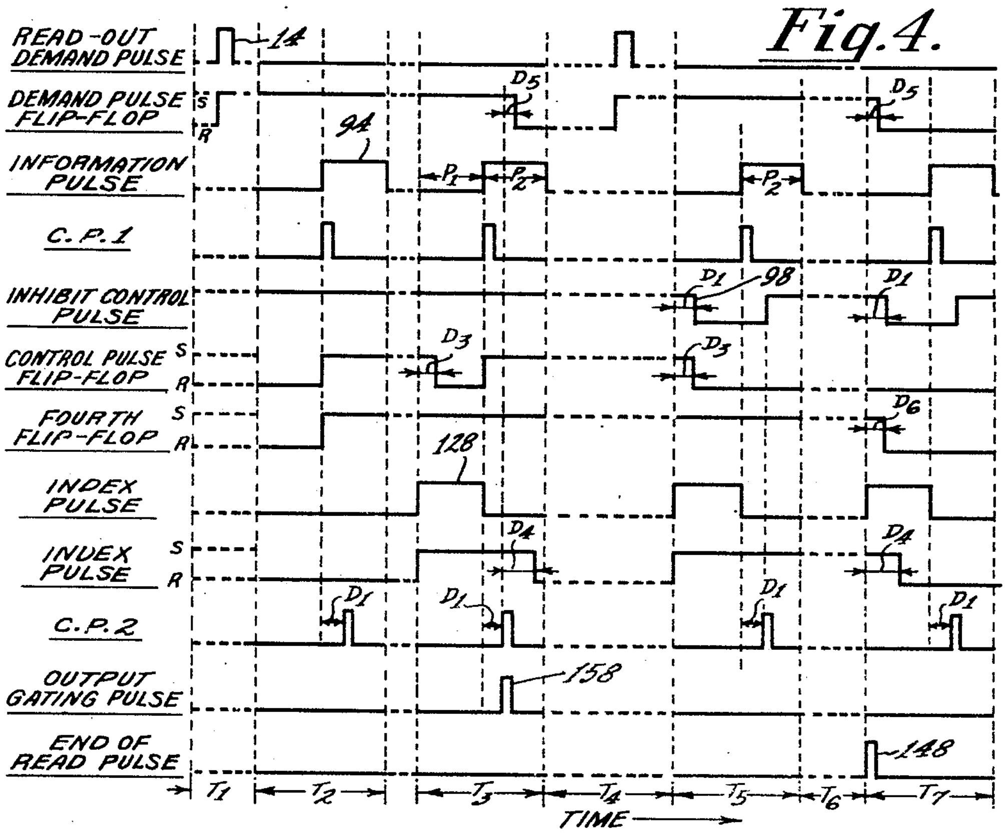
Figure 4 is an idealized graphical timing diagram showing the relationships of waveforms occurring at various portions of the system of Figure 3.

Reference is made to Figure 4, which shows the time relationships of waveforms occurring at various portions of the circuit of Figure 3. During a first time interval $T_1$, a first read-out demand pulse 14 is received that sets the demand-pulse flip-flop 130 to provide a first enabling signal for the gating pulse gate 132. Time interval $T_2$ represents the period during which the next succeeding information character is read from the information channels 20. CP1 produced by that information character serves to set the control-pulse flip-flop 136, since there are no control pulses yet written into the drum 18 to inhibit gate 134. When the control-pulse flip-flop 136 is set, a second enabling signal is applied to the gating pulse gate 132. At the same time, the fourth flip-flop 138 is set to provide an enabling signal for the index-pulse gate 140.

The next time interval $T_3$ shown in Figure 4 represents the period during which the first character 112 is read from the drum 18. The index pulse 128 which is produced at the beginning of this period $T_3$ is passed by the gate 140 to set the index-pulse flip-flop 142 and also after a delay $D_3$ to reset the control-pulse flip-flop 136. When CP1 occurs at the beginning of the second half-period $P_2$ of $T_3$, the control-pulse flip-flop 136 is again set. Thus, at that time, there are three enabling signals applied to the gating-pulse gate 132, since the demand-pulse flip-flop 130, the control-pulse flip-flop 136, and the index-pulse flip-flop 142 are all set. Accordingly, after a delay $D_1$ from the start of the second half-period $P_2$, CP2 occurs and is passed through the gating pulse gate 132 to provide a gating pulse 158 that is applied to the output gates 36. As a result, the first information character 112 on the drum 18 is read-out to the output device 10. The same gating pulse 158 is also applied to the control-pulse write amplifier 80 to write a first pulse 100 in the control-pulse channel 22 in the manner described above. The demand-pulse flip-flop 130 and the index-pulse flip-flop 142 are also reset by the gating pulse 158 after delay of $D_5$ and $D_4$, respectively.

During the time interval $T_4$, the next read-out demand pulse 14 is received, and the demand-pulse flip-flop 130 is set. During time interval $T_5$, the index pulse 128 again sets the index-pulse flip-flop 142 and resets the control-pulse flip-flop 136. After a delay $D_1$ from the beginning of the time period $T_5$, the control pulse 100 for the first character 112 is read. The inhibit control pulse 98 overlaps the beginning of the second half-period $P_2$ of $T_5$, so that the gate 134 is inhibited, and CP1 is not passed. Thus, the control-pulse flip-flop 136 remains reset during time interval $T_5$, and a gating pulse 158 is not produced.

However, the inhibit gate 134 is not inhibited during the reading of the second character 104 on the drum. Consequently, CP1 for this second character 104 sets the control-pulse flip-flop 136. Since the demand-pulse flip-flop 130 and the index-pulse flip-flop 142 are still in the set condition, the gating-pulse gate 132 is enabled to pass CP2 for the second character 104. Thus, the second character 104 is read out to the output device 10. Also, a second control pulse 106 is written in the control pulse channel 22 in a position corresponding to the second character 104 on the drum 18.

The operations described are repeated for each demand pulse 14 that is received; the next information character being read out for each succeeding demand pulse. When the last character on the drum 18 is read out, the next character that is read is the first character 112. The index pulse 114 is read at the same time, and it serves to reset the control-pulse flip-flop 136. The control-pulse flip-flop 136 remains reset throughout this revolution of the drum, because each CP1 produced by a character is inhibited by a corresponding control pulse 98.

At the beginning of the next drum revolution, the index pulse 114 is again read. This time interval is shown as $T_7$ in Figure 4. The end-of-read gate 144 receives an enabling signal from the 0-output of the control-pulse flip-flop 136 which is reset. Consequently, the index pulse 128 is passed by this gate 144 to provide an end-of-read pulse. The end-of-read pulse is applied through the delay line 150 to reset the fourth flip-flop 138 and also through the "Or" gate 152 and delay lines 154, 156 to reset the demand-pulse and index-pulse flip-flops 130, 154. The end-of-read pulse may be applied as a "start" pulse to the input device and, also, to the reset side of the flip-flops 38 and 118 as a "write" pulse. Accordingly, the signals stored on the drum may be erased, a new burst of information written into the magnetic drum, and the read-out cycle repeated.

When the fourth flip-flop 138 is in the reset condition, the gate 140 is closed. Consequently, if the first character 112 is the one that is read immediately after the first demand pulse 14 is received, the index pulse 128 is blocked by the gate 140. Therefore, an end-of-read pulse 148 is not generated by the gate 144 even though the control-pulse flip-flop is in the reset condition at that time. The logic network generates an end-of-read pulse only after the read-out of the last character.

It is evident from the above description of this invention that a new and improved system is provided for transferring information between information handling devices that operate at widely different rates. The information is nonsynchronous and takes place at an optimum speed. An improved serial memory system is provided that may be used to control the order of information transfer. The apparatus employed is reliable and economical.

What is claimed is:

1. A serial memory system comprising a plurality of parallel channels including a unitary control channel for separately storing signals serially, means for reading signals from said channels, means responsive to signals read from said control channel for controlling the transmission of signals read from another of said channels, and means responsive to signals read from said another channel for writing signals in said control channel.

2. A serial memory system comprising a plurality of parallel channels including a unitary control channel for separately storing signals serially in a predetermined order with each of the signals in said control channel having a predetermined relationship to a signal of corresponding order in a first one of the other of said channels, means for reading signals of corresponding order from said channels in a predetermined time relationship, means responsive to signals read from said control channel for controlling the transmission of signals of corresponding order read from said first channel, and means for writing signals of corresponding order in said control channel upon the reading of signals from said first channel.

3. A serial memory system as recited in claim 2 and further comprising means for enabling said transmission controlling means and said writing means upon the reading of a predetermined one of said first channel signals.

4. A serial memory system comprising a cyclic memory including a plurality of parallel channels and a unitary control channel for separately storing signals serially in a predetermined order with each of the signals in said control channel having a predetermined relationship to a signal of corresponding order in a first one of said other channels, said control channel signals being of first and second types, said cyclic memory further including means for reading signals of corresponding order from said channels in a predetermined time relationship, output means, means responsive to said control channel first signals for preventing the transmission of said first channel signals to said output means, responsive to said control channel second signals for enabling the transmission of said first channel signals to said output means, and responsive to said control channel second signals and said first channel signals for writing in said control channel first signals of order corresponding to said first channel signals.

5. A serial memory system as recited in claim 4 and further comprising means for enabling said signal responsive means upon the reading of a predetermined one of said first channel signals.

6. A serial memory system comprising a cyclically movable member having a magnetizable surface, a first and a second channel each extending along said surface in the direction of movement of said member for magnetically storing signals in a predetermined serial order said second channel being a control channel with each of said second channel signals having a predetermined relationship to a first channel signal of corresponding order, means for reading signals of corresponding order from said channels in a predetermined time relationship, output means, means responsive to signals read from said second channel for controlling the transmission to said output means of first channel signals of corresponding order, and means for writing signals of corresponding order in said second channel upon the reading of signals from said first channel, said reading and writing means including a unitary read-write head in each of said channels.

7. A serial memory system as recited in claim 6 and further comprising means for enabling said transmission controlling means and said writing means upon the reading of a predetermined one of said first channel signals.

8. A serial memory system comprising a plurality of parallel channels including a control channel for separately storing signals serially in a predetermined order with each of the signals in said control channels having a predetermined relationship to a signal of corresponding order in a first one of the other of said channels, means for reading signals of corresponding order from said channels in a predetermined time relationship, and means for writing signals of corresponding order in said control channel upon the reading of signals from said first channel, and said reading and writing means includes a unitary read-write head for each of said channels.

9. A serial memory system as recited in claim 8 and further comprising means for cyclically presenting said stored signals to said reading means.

10. A serial memory system comprising a movable member having a magnetizable surface, a first and a second channel each extending along said surface in the direction of movement of said member for magnetically storing signals in a predetermined order, means for reading signals of corresponding order from said first and second channels in a predetermined time relationship, and means responsive to said read first channel signals for writing signals in said second channel in accordance with said predetermined time relationship,, said second channel being a control channel and said reading and writing means including a unitary read-write head for each of said channels.

11. A serial memory system comprising a cyclically movable member having a magnetizable surface, a first and a second channel each extending along said surface in the direction of movement of said member for magnetically storing signals in a predetermined serial order, means for reading signals from said first channel, and means for indicating the reading of said first channel signals including means for writing signals in said second channel in a predetermined relationship to said read first channel signals upon the reading of said first channel signals, said first channel being an information channel and said second channel a control channel and said reading means and said writing means including a unitary read-write head for each of said channels.

12. A serial memory system as recited in claim 11 and further comprising output means, means for reading said control channel signals in a predetermined time relationship with corresponding ones of said information channel signals, and means responsive to said control channel signals for preventing transmission to said output means of corresponding ones of said information channel signals.

13. A serial memory system comprising a movable magnetizable member having a plurality of parallel channels including a unitary control channel extending along said surface in the direction of movement of said member for magnetically storing signals in a predetermined serial order, means for reading signals of corresponding order from said information channels in a predetermined time relationship, including separate unitary magnetic transducing means operatively positioned adjacent each of said channels for producing a voltage waveform in accordance with the time derivative of flux presented to said transducing means by each of said magnetically stored signals, means for writing an information signal in a first one of said information channels with a portion of the voltage waveform associated therewith occurring at a predetermined time with respect to the movement of said member past said transducing means, means for writing a signal in the said control channel at a time subsequent to said predetermined time, and means responsive to the waveform associated with said written control channel signal for controlling the effect of said waveform portion associated with said information channel signal.

14. A serial memory system as recited in claim 13 wherein said means for writing a signal in said control channel is responsive to said waveform portion associated with said information channel signal for writing a signal of corresponding order in said control channel, and said means for controlling the effect of said waveform portion inhibits the effect thereof on said means for writing a signal in said control channel.

15. An information rate converting system for an input and an output device operating in accordance with different non-synchronous information rates, said converting system comprising a cyclically movable member having a magnetizable surface, a plurality of first channels and a second control channel extending along said surface in parallel and in the direction of said member for magnetically storing signals in a predetermined serial order, means for writing information signals from said input device in said first channels at said input device information rate, and means for reading out signals from said first channels, said read-out means including means for continuously reading signals of corresponding order from said first and second channels in a predetermined time relationship, and means responsive to signals from said output device and the absence of signals read from said second channel for passing corresponding order first channel signals to said output device and for writing corresponding order signals in said second channel, said second channel reading and writing means including a unitary read-write head associated with said second channel.

16. A serial memory system comprising a cyclically movable member having a magnetizable surface, an information channel and a control channel extending along said surface in the direction of movement of said member for magnetically storing signals in a predetermined serial order with each of said control channel signals having a predetermined relationship to an information channel signal of corresponding order, said control channel signals being of first and second types, means for reading signals of corresponding order from said channels in a predetermined time relationship, means responsive to said control channel first signals for producing a first enabling signal, means for producing a second enabling signal upon the reading of a predetermined one of said information channel signals, output means and means responsive to said first and second enabling signals for controlling the transmission to said output means of said information channel signals and for controlling the writing of said second type signals of corresponding order in said control channel, said control channel reading and writing means including a unitary read-write head.

17. A serial memory system as recited in claim 16 wherein said means for producing a first enabling signal is responsive to said control channel second signals for producing an inhibiting signal.

18. A serial memory system as recited in claim 17 wherein said means for producing a second enabling signal includes means for recognizing the type of said predetermined information channel signal.

19. A serial memory system as recited in claim 16 and further comprising a clock pulse generator responsive to said information channel signals for producing a plurality of time spaced clock pulses, and a first flip-flop means responsive to a demand signal from said output means for producing a third enabling signal, and wherein said means for producing a second enabling signal is responsive only to the simultaneous occurrence of said third enabling signal and the recognition of said predetermined information channel signal for producing said second enabling signal, and said transmission and writing controlling means includes gate means responsive to the simultaneous occurrence of said first and second enabling signals and one of said clock pulses for producing a fourth enabling signal, and additional gate means responsive to the simultaneous occurrence of said fourth enabling signal and another one of said clock pulses for passing information channel signals to said output means and for producing a second type signal to be written in said control channel.

20. A serial memory system as recited in claim 17 wherein said means for producing a second enabling signal includes a second control channel for storing an index signal having a predetermined relationship to said predetermined information channel signal, and means for reading said index signal with the reading of said predetermined information channel signal.

21. A serial memory system as recited in claim 20 and further comprising a clock pulse generator responsive to said information channel signals for producing a plurality of time spaced clock pulses, and a first flip-flop means responsive to a demand signal from said output means for producing a third enabling signal, and wherein said means for producing a first enabling signal includes a second flip-flop means responsive only to the simultaneous occurrence of a control channel first signal and one of said clock pulses for producing said first enabling signal, said means for producing a second enabling signal includes a third flip-flop means responsive to said index signal, and said transmission and writing controlling means includes gate means responsive to the simultaneous occurrence of all three of said enabling signals and another of said clock pulses for passing information channel signals to said output means and for producing a second type signal to be written in said control channel.

22. A serial memory system comprising a channel for storing signals serially, means for writing signals in said channel in a predetermined order and for reading the written signals in the same order, signal responsive means for applying signals to said writing means to be written in said channel in predetermined locations, and means responsive to signals read from said predetermined locations for inhibiting said signal applying means, said writing and reading means including a unitary read-write head for said channel.

23. A serial memory system as recited in claim 22 and further comprising means for cyclically presenting said stored signals to said reading means.

24. A serial memory system as recited in claim 22 and further comprising a cyclically movable member having a magnetizable surface, said channel including a portion of said surface for magnetically storing signals.

25. A serial memory system comprising a plurality of parallel channels including a unitary control channel for separately storing signals serially in a predetermined order with each of the signals in said control channel having a predetermined relationship to a signal of corresponding order in a first one of the other of said channels, means for reading signals of coorresponding order from said channels in a predetermined time relationship, and means for writing signals of corresponding order in said control channel upon the reading of signals from said first channel.

26. A serial memory system as recited in claim 25, further comprising means for cyclically presenting said stored signals to said reading means.

27. A serial memory system comprising a plurality of parallel channels including a control channel for separately storing signals serially in a predetermined order with each of the signals in said control channel having a predetermined relationship to a signal of corresponding order in a first one of the other of said channels, means for reading signals of corresponding order from said channels in a predetermined time relationship, means responsive to signals read from said control channel for controlling the transmission of signals of corresponding order read from said first channel, and means for writing signals of corresponding order in said control channel upon the reading of signals from said first channel, said reading and writing means including a unitary read-write head for and corresponding to each of said channels.

28. A serial memory system as recited in claim 27, further comprising means for enabling said transmission controlling means and said writing means upon the reading of a predetermined one of said signals from said first channel.

29. A serial memory system comprising a cyclical memory including a plurality of parallel channels further including a control channel for separately storing signals serially in a predetermined order with each of the signals in said control channel having a predetermined relationship to a signal of corresponding order in a first one of said other channels, said control channel signals being of first and second types, said cyclical memory further including means for reading signals of corresponding order from said channels in a predetermined time relationship, output means, and means, responsive to said control channel first signals for preventing the transmission of said first channel signals to said output means, responsive to said control channel second signals for enabling the transmission of said first channel signals to said output means and responsive to said control channel second signals and said first channel signals for writing in said control channel first signals of order corresponding to said first channel signals, said reading and writing means including a unitary read-write head for each of said channels.

30. A serial memory system as recited in claim 29, further comprising means for enabling said signal responsive means upon the reading of a predetermined one of said first channel signals.

31. A serial memory system comprising a movable magnetizable member having a plurality of parallel channels including a unitary control channel and several information channels extending along said surface in the direction of movement of said member for magnetically storing signals in a predetermined serial order, means for reading signals of corresponding order from said information channels in a predetermined time relationship, including separate magnetic transducing means each different one operatively positioned adjacent each of said channels for producing a voltage waveform in accordance with the time derivative of flux presented to said transducing means by said magnetically stored signals, means for writing an information signal in a first one of said information channels with a portion of the voltage waveform associated with said information channel signal occurring at a predetermined time with respect to the movement of said member past said transducing means, means for writing a signal in the said control channel at a time subsequent to said predetermined time, and means responsive to the waveform associated with said written control channel signal for controlling the effect of said waveform portion associated with said information channel signal.

32. A serial memory system as recited in claim 31, wherein said means for writing a signal in said control channel is responsive to said waveform portion associated with said information channel signal for writing a signal of corresponding order in said control channel, and said means for controlling the effect of said waveform portion inhibits the effect thereof on said means for writing a signal in said control channel.

33. An information rate converting system for an input and an output device operating in accordance with different non-synchronous information rates, said converting system comprising a cyclically movable member having a magnetizable surface, a plurality of first channels and a unitary control channel extending along said surface in parallel and in the direction of said member for magnetically storing signals in a predetermined serial order, means for writing information signals from said input device in said first channels at said input device information rate, and means for reading out signals from said first channels, said read-out means including means for continuously reading signals of corresponding order from said first channels and said control channel in a predetermined time relationship, and means responsive to signals from said output device and the absence of signals read from said control channel for passing corresponding order first channel signals to said output device and for writing corresponding order signals in said control channel.

34. A serial memory system comprising, a cyclically movable member having a magnetizable surface, an information channel and a unitary control channel extending along said surface in the direction of movement of said member for magnetically storing signals in a predetermined serial order with each of said control channel signals having a predetermined relationship to an information channel signal of corresponding order, said control channel signals being of first and second types, means for reading signals of corresponding order from said channels in a predetermined time relationship, means responsive to said control channel first signals for producing a first enabling signal, means for producing a second enabling signal upon the reading of a predetermined one of said information channel signals, output means and means responsive to said first and second enabling signals for controlling the transmission to said output means of said information channel signals and for controlling the writing of said second type signals of corresponding order in said control channel.

35. A serial memory system as recited in claim 34, wherein said means for producing a first enabling signal is responsive to said control channel second signals for producing an inhibiting signal.

36. A serial memory system as recited in claim 35, wherein said means for producing a second enabling signal includes means for recognizing the type of said predetermined information channel signal.

37. A serial memory system as recited in claim 34 and further comprising a clock pulse generator responsive to said information channel signals for producing a plurality of time spaced clock pulses, and a first flip-flop means responsive to a demand signal from said output means for producing a third enabling signal, and wherein said means for producing a second enabling signal is responsive only to the simultaneous occurrence of said third enabling signal and the recognition of said predetermined information channel signal for producing said second enabling signal, and said transmission and writing controlling means includes gate means responsive to the simultaneous occurrence of said first and second enabling signals and one of said clock pulses for producing a fourth enabling signal, and additional gate means responsive to the simultaneous occurrence of said fourth enabling signal and another one of said clock pulses for passing information channel signals to said output means and for producing a second type signal to be written in said control channel.

References Cited in the file of this patent

UNITED STATES PATENTS

| | | |
|---|---|---|
| 2,614,169 | Cohen | Oct. 14, 1952 |
| 2,700,148 | McGuigan | Jan. 18, 1955 |
| 2,770,797 | Hamilton | Nov. 13, 1956 |

OTHER REFERENCES

A publication entitled "Universal High-Speed Digital Computers: A Magnetic Store," by Williams, Kilburn, and Thomas in the Proceedings of the Institute of Electrical Engineering (pages 101 and 102 relied upon), April 1952.